25802

Sept. 10, 1963      A. M. STEFFEN      3,103,352

WORK HOLDER

Filed Feb. 14, 1961

ARNOLD M. STEFFEN
INVENTOR.

BY Albert M. Herzig

ATTORNEY.

United States Patent Office 3,103,352
Patented Sept. 10, 1963

3,103,352
WORK HOLDER
Arnold M. Steffen, 5302 Don Pio Drive,
Woodland Hills, Calif.
Filed Feb. 14, 1961, Ser. No. 89,309
12 Claims. (Cl. 269—45)

This invention relates to an improved work holder adapted for use in holding work for drilling, milling, grinding, and other operations of a similar nature. The work holder or holding appliance is also adapted for holding two work pieces relative to each other with precision and it is adaptable for use with work pieces in the form of round stock and other shapes as well.

In an exemplary form of the invention as disclosed herein, it is a work holder or appliance of the V-block and clamp type. By reason of its new and original construction, it has manifold capabilities and adaptabilities heretofore not available in work holders or holding appliances. Illustratively, the work holder or appliance in the exemplary form disclosed in detail herein, comprises two members rotatably held together. The members can be separated and used individually. Each of these members is provided with a V-notch so that in effect there is provided a V-block with oppositely disposed V-notches. Each of the said members has a circumferential annular groove. Clamping yokes are provided having threaded stems for clamping work or stock to be held in one or both of the V-notches. The clamping yoke (or yokes) has in-turned parts or lugs on the ends of the legs of the yoke adapted to be received in one of the annular grooves. Thus, it can be seen that the two members can be rotated to any position relative to each other so that the V-notches are disposed at any predetermined angle relative to each other. The in-turned parts or lugs at the ends of the legs of the yoke are rotatable in the annular groove referred to so that the clamping yoke may be rotated to any angular position with respect to its respective holding member. The said members have flat end surfaces as well as having the V-notches adapting the appliance for holding flat-sided work or stock as well as holding round stock. Additionally, a clamping yoke having longer legs is provided so that it can be used with the end parts of the legs engaging one of the members of the appliance with a piece of stock, clamped in the other member, so that the two members are forcibly held together to prevent relative rotation, in instances where it is desired that the two members be firmly held agianst relative rotation.

The two parts or members may be each used individually. One of the members may for example be positioned against an angle stop but may by itself be rotated through 360° without ever being moved from its otherwise fixed position.

The invention has tremendous adaptability for inspection set-ups, that is placing or holding pieces in particular positions or in locations that are relatively inaccessible, as will become apparent from the description hereinafter.

From the foregoing brief outline of the nature of the invention, it will be observed that it provides a work holder having universal characteristics adapting it for a widely increased range of service. The primary object of the invention is to provide a work holder or holding appliance having such increased capabilities and adaptabilities for facilitating the holding of work in different desired positions or for holding one or more work pieces with precision in desired positions relative to each other.

A further object is to provide a work holder or appliance comprising two relatively rotatable parts or members, each member having a work holding conformation which can be adjusted to a desired relative angular position with respect to the other member.

Another object is to provide a work holder as in the foregoing wherein the two members are in the form of V-blocks held together for relative rotation with the desired degree of tension and are separable for individual use.

Another object is to provide a work holder as in the foregoing wherein the two members are circular, each having a circumferential annular groove adapted to receive end parts or lugs on the ends of the legs of a clamping yoke.

Another object is to provide a work holder as in the foregoing, including a clamping yoke of sufficient dimensions that it is adapted for holding a work piece in one of the members with the ends of the legs of the yoke engaging the other member so as to hold the two members non-rotatably together.

Further objects and many detailed additional advantages of the invention will appear from the following detailed description and annexed drawings, wherein.

Figures 1, 2, 3:
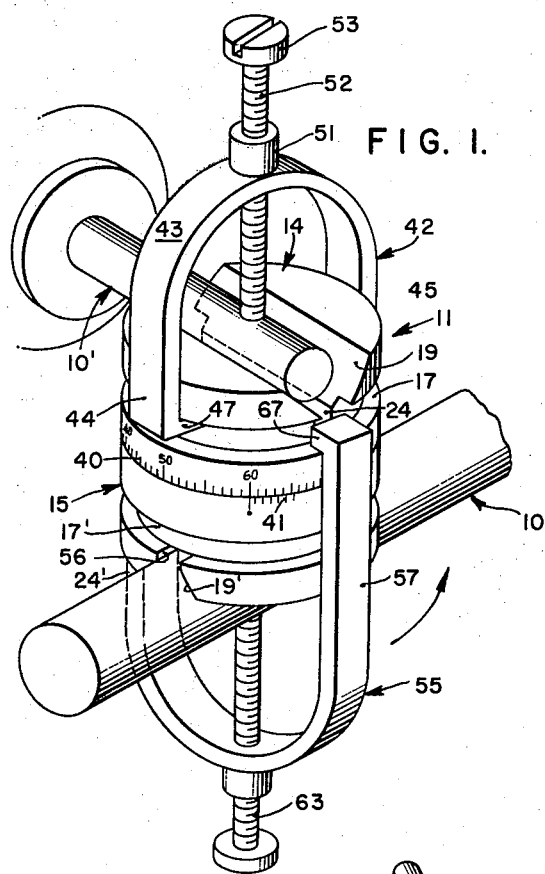
FIG. 1 is a perspective view of one of the units of the invention holding pieces of round stock at an angle to each other.
FIG. 2 is a disassembled view of one of the work holders of the invention.
FIG. 3 is a perspective view illustrating utilization of the work holders in an inspection set-up.

Referring now more particularly to FIG. 1 of the drawings, numerals 10 and 10' show pieces of round stock being held by one of the work holders. Numeral 11 designates the work holder as a whole. This work holder is shown disassembled in FIG. 2.

The work holder 11 comprises cylindrical or circular members 14 and 15. The member 14 has a circumferential annular groove 17 having square shoulders. It has a V-notch 19 so that it forms a V-block. It has an axial bore and a counterbore 22. Also it has a transverse slot 24 at the bottom of the V-notch 19. The member 14 has an extending boss 27 slightly smaller in diameter.

The member 15 is similar to the member 14, having an annular groove 17' and a V-notch 19' and also a transverse slot 24'. The member 15 has in it a circular depression 28 of a diameter to receive the boss 27 of the member 14 so that the parts interfit together, as shown in FIG. 1.

The member 15 has an axial bore 30 in which is received a threaded part 31 on a stem 32. The stem 32 is attached to a plug 35 received in the bore 22 in the member 14. The plug 35 has a head 36 having a kerf 37 to receive a screw driver. Beneath the head 36 is a coil compression spring 39. As can be seen, the two members 14 and 15 are rotatably held together by the screw or threaded attachment which is adjustable to hold them together with the desired degree of force. The members might also be held together magnetically.

Preferably, one of the parts, for example, 14 is graduated in degrees as shown at 40 which graduations may move opposite a vernier scale 41 on member 15.

FIG. 1 shows a commonly used adaptability of the device. As can be seen, the parts can be rotated relatively through 360° and set. As may be seen, a piece held may be accurately moved to any position on the surface of a sphere. The adaptability of the invention for inspection set-ups is thus apparent, and as will be made even more clear in connection with FIG. 3.

Numeral 42 designates generally a screw clamp which may be used with the work holders. It is in the form of a yoke 43 having legs 44 and 45 which are offset outwardly slightly from the curved part of the yoke. The legs 44 and 45 have inwardly turned end parts or lugs as shown at 47 which are adapted to be received in one of the grooves 17 or 17'. At the closed end of the yoke, it is provided with a threaded boss or bushing 51 receiving the screw threaded stem 52, the end of which is adapted to engage the work to be held. A rotating knob or button 53 is provided on the end of the stem 52. The yoke 42 is rotatable to any desired angular position in the groove 17. The button 53 may have a kerf if desired.

FIG. 1 shows a slightly longer yoke 55 having legs 56 and 57, which are slightly longer and have in-turned end parts or lugs as shown at 67. The closed end of the yoke 55 has a threaded stem 63 having a button extending through it, the end of which is engageable with the work piece to be held. The yoke 55 is able to hold a work piece 10 in the V-notch of one of the members, that is, the member 15, while the ends of the yoke are engaged in the groove 17 in the other member 14. As can be seen, therefore, the force exerted by the clamping yoke holds the two members 14 and 15 non-rotatably together. FIG. 1 shows a general adaptation of the invention, wherein one of the yokes has longer legs for the purpose described above. As shown, the short clamp may be used to first position one V-block or clamp one piece and then the long clamp simultaneously grips a piece and secures the blocks together.

As may be understood, the work holder may be mounted from the bed of a machine tool or may be mounted from any other platform. With one of the members secured to the other member as described, it is rotatable relative to it so that the V-notch 19 can be aligned in any desired angular direction. The yoke 42 is rotatable as described to any angular position relative to the V-notch 19. Other shapes of stock or work pieces may be held against the flat end surfaces of the member 14 or the member 15 and the yoke 42 may have any angular position to accommodate the holding of such a work piece. As described above, using the yoke 55 the members 14 and 15 are non-rotatably held together. Also as pointed above the members may be separated and used individually, such as being positioned against an angle stop or otherwise.

The work holder is adaptable for holding two work pieces in precision relationship to each other. For example, as seen in FIG. 1, the V-notch 19' of the member 11 is substantially at right angles to the V-notch 19 in the member 14. Two of the yokes 42 may be used, or on the other hand, one of such yokes and yoke 55 may be used, or two of the yokes 55 may be used.

FIG. 3 shows two of the work holders holding round stock illustrating use of the invention in an inspection set-up. The work holders shown might be mounted from the bed of a machine tool or from any other platform. The circular end parts adjacent the annular grooves are adapted for being received in an undercut slot in the bed of a machine tool or the like. On the other hand, as shown in FIG. 3, the work holders may be mounted from other elements such as the round member 60 adjustably held from a support platform 61 having up-right 62 and rotatable holder 63 holding rod 60. FIG. 3 shows two of the holders 11 and 11'. Holder 11 is clamped to rod 60 and a rod 65 in a manner as described in connection with FIG. 1. Holder 11' is clamped to rod 65 and to another rod 66 which might hold an inspection or testing instrument or the like. As can be seen, any geometrical or other position can be accurately realized and otherwise inaccessible or hard to reach places can be adapted for.

From the foregoing, those skilled in the art will observe that the work holder or appliance has generally universal capabilities and adaptabilities. It will be observed that it realizes and achieves the objects stated in the foregoing and that it has manifold advantages not heretofore available in this type of appliance. The device is very rugged, accurate, and positive although universally adaptable. It is much less subject to wear and deterioration than devices of the prior art intended for similar usage.

The foregoing disclosure is representative of preferred forms of the invention and is to be interpreted in an illustrative rather than a limiting sense, the invention to be accorded the full scope of the claims appended hereto.

What is claimed is:

1. A holding appliance adapted to clamp a work piece in any angular position in a plane, comprising:
    (a) a circular cylindrical member having a circumferential groove in its side surface adjacent to and spaced from its end surface; and
    (b) a yoke mounted over said end surface, said yoke having legs slidably mounted in said groove and having means for clamping a work piece to said end surface of said member,
whereby said work piece and yoke can be rotated to any angular position parallel to the end surface of said member.

2. A holding appliance as stated in claim 1 wherein said member has a notch formation in said end surface adjacent to said yoke adapted to receive a work piece.

3. A holding appliance as stated in claim 2 wherein said notch formation is a V-shaped notch.

4. A holding appliance as stated in claim 1 which includes a base on which said member is rotatably mounted.

5. A holding appliance adapted to clamp a first work piece in any angular position in a first plane and a second work piece in an angular position in a second plane, said second plane being at a fixed angle to said first plane, comprising:
    (a) a first circular cylindrical member having a circumferential groove in its side surface adjacent to and spaced from its first end surface;
    (b) a first yoke mounted over said first end surface of said member, said yoke having legs slidably mounted in the groove in said first member and having means for clamping a work piece to the first end surface of said first member;
    (c) a second circular cylindrical member rotatably mounted on said first member and having its first end surface remote from said first member, said first and second members having a common longitudinal axis and abutting second end surfaces; and
    (d) a second yoke mounted over said first end surface of said second member, said yoke having legs slidably mounted in the groove in said first member and having means for clamping a work piece to the first end surface of said second member.

6. A holding appliance as stated in claim 5 which includes means for holding said first and second members together with an adjustable degree of tension.

7. A holding appliance as stated in claim 5 wherein said second member has a circumferential groove in its side surface adjacent to and spaced from its first end surface.

8. A holding appliance as stated in claim 5 wherein each of said first end surfaces has a notch formation adapted to receive a work piece.

9. A holding appliance as stated in claim 8 wherein said notch formation is a V-shaped notch.

10. A holding appliance adapted to clamp a first work piece in any angular position in a first plane and a second work piece in any angular position in a second plane, said second plane being at a fixed angle to said first plane, comprising:
    (a) a first circular cylindrical member having a circumferential groove in its side surface adjacent to and spaced from its first end surface;
    (b) a first yoke mounted over said first end surface of said first member, said yoke having legs slidably mounted in the groove in said first member and having means for clamping a work piece to the first end surface of said first member;
    (c) a second circular cylindrical member rotatably mounted on said first member and having a first end surface remote from said first member and a circumferential groove in its side surface adjacent to and spaced from its first end surface, said first and second members having a common longitudinal axis and abutting second end surfaces;

(d) a second yoke mounted over said first end surface of said second member, said yoke having legs slidably mounted in the groove in said second member and having means for clamping a work piece to the first end surface of said second member; and (e) means for holding said first and second members together with an adjustable degree of tension.

11. A holding appliance as stated in claim 10 wherein each of said first end surfaces has a notch formation adapted to receive a work piece.

12. A holding appliance as stated in claim 11 wherein said notch formation is a V-shaped notch.

References Cited in the file of this patent

UNITED STATES PATENTS

| | | |
|---|---|---|
| 230,005 | Hall | July 13, 1880 |
| 1,274,681 | Carswell | Aug. 6, 1918 |
| 1,323,127 | Treuthardt | Nov. 25, 1919 |
| 1,463,706 | Ketchum | July 31, 1923 |
| 1,476,611 | Hines | Dec. 4, 1923 |
| 1,802,914 | Gruber | Apr. 28, 1931 |
| 2,364,150 | Lowenstein | Dec. 5, 1944 |
| 2,824,536 | Gamble | Feb. 25, 1958 |